United States Patent

[15] 3,694,736

Wakefield

[45] Sept. 26, 1972

[54] APPARATUS FOR LOCATING CONDUCTOR DISCONTINUITY IN SEMI-CONDUCTING SHIELDED CABLE

[72] Inventor: Frederick W. Wakefield, 26 Sunset Drive, Northboro, Mass. 01532

[73] Assignee: United States Steel Corporation

[22] Filed: March 16, 1971

[21] Appl. No.: 124,890

[52] U.S. Cl. .............................................324/51
[51] Int. Cl. ............................................G01r 31/02
[58] Field of Search.............................324/51, 54

[56] References Cited

UNITED STATES PATENTS

| 3,156,863 | 11/1964 | Wakefield | 324/54 |
| 3,096,478 | 7/1963 | Brown | 324/54 |
| 3,564,403 | 2/1971 | Schwarz | 324/51 |
| 3,321,703 | 5/1967 | Tyszewicz | 324/54 |
| 3,134,071 | 5/1964 | Wakefield | 324/54 |
| 3,354,386 | 11/1967 | Daigle et al. | 324/54 |

Primary Examiner—Gerard R. Strecker
Attorney—Rea C. Helm

[57] ABSTRACT

Detection of conductor discontinuity location in a semi-conducting shielded electric cable. The cable is passed over spaced apart electrical contacts providing an alternating current through the shield between the contacts. As the cable is moved over the contacts, a capacitance coupled current is induced in the conductor and a change in the current locates the discontinuity as it passes the electrical contacts.

2 Claims, 3 Drawing Figures

PATENTED SEP 26 1972 3,694,736

INVENTOR
FREDERICK W. WAKEFIELD

By Rea C. Helm
Attorney

APPARATUS FOR LOCATING CONDUCTOR DISCONTINUITY IN SEMI-CONDUCTING SHIELDED CABLE

This invention relates to an apparatus for locating a conductor discontinuity in an electrical cable and more particularly to apparatus for locating a conductor discontinuity in an electrical cable with a semi-conducting sheath as the cable is pulled from one reel to another reel.

Broken conductors in semi-conducting shielded electric cables are usually located by measuring the ground capacity of each end of the faulty conductor and then assuming that the cable capacity is proportional to the cable length. The usual accuracy of this capacity method is plus or minus 2 percent or, for example, plus or minus 400 feet in a 20,000 foot length of cable. This means that 800 feet of such a cable must be carefully examined or dissected to locate break. A signal tracing method can also be used to detect a break, but is generally unsatisfactory for shielded cable because the shield greatly reduces the signal pick-up.

In accordance with my invention, as the cable containing a broken conductor is passed from one reel to another, the cable contacts two spaced apart sheaves that pass a high voltage alternating current through the semi-conducting sheath. A detector, part of a circuit connected to one end of the broken conductor, then automatically indicates the break location when a capacitance coupled current begins to flow in the conductor.

It is therefore an object of my invention to provide an apparatus for accurately locating a conductor discontinuity in a semi-conducting shielded cable while it is being re-reeled.

Another object is to provide apparatus for automatically locating a conductor discontinuity in a semi-conducting shielded cable.

These and other objects will become more apparent after referring to the following specification and attached drawing in which.

Figure 1:
FIG. 1 is a cross-sectional view of one type of cable which may be tested according to my invention.
Figure 2:
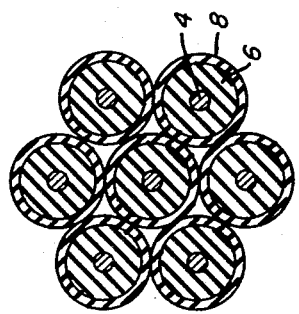
FIG. 2 is a view, similar to FIG. 1, showing a second cable which may be tested according to my invention.
Figure 3:
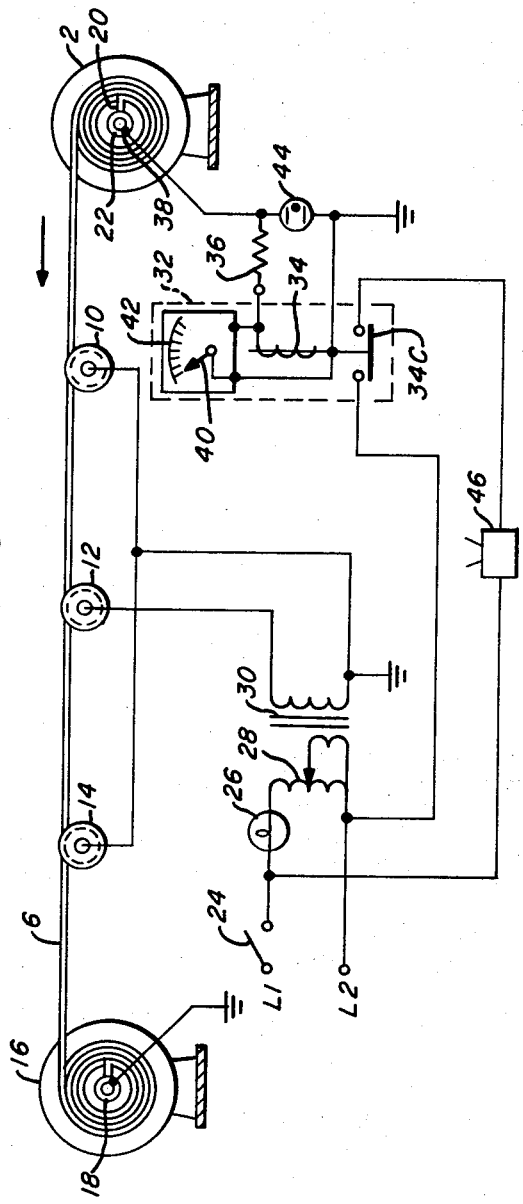
FIG. 3 is a schematic view of the preferred embodiment of my invention.

Referring now to the drawing, reference numeral 2 indicates a pay-off reel for supporting electric cable C to be tested. As shown in FIG. 1, the cable C consists of a conductor 4 surrounded by insulation 6 which in turn is surrounded by a thin layer of semi-conducting material 8 which forms the shield. Cable C may also be such as shown in FIG. 2 wherein seven cables, such as shown in FIG. 1, are stranded together to form a multiple conductor cable. It will be seen that the semi-conducting shields 8 contact each other. From the pay-off reel 2, the cable passes over three spaced apart grooved pulleys 10, 12 and 14 to a take-up reel 16. The spacing between pulleys 10 and 12 is the same as the spacing between pulleys 12 and 14. The pulleys 10 and 14 are connected to ground. Take-up reel 16 is provided with the usual drive mechanism, not shown, for pulling the cable from reel 2 over the pulleys 10, 12 and 14. All the conductors of cable C are connected to ground through a slip ring 18 on take-up reel 16. All the conductors of cable C, except the broken one 20, are connected to ground through a slip ring, not shown, on reel 2. It is assumed that the conductor discontinuity is located on reel 2. The broken conductor 20, at reel 2, is connected to a slip ring 22 which is insulated from ground. A source of alternating current power, L1 and L2, is connected through a switch 24 and a lamp 26 to a continuously adjustable auto transformer 28. A voltage from transformer 28 is fed to a high voltage step-up transformer 30. One side of the high voltage winding of transformer 30 is connected to ground and the other side to pulley 12 which contacts the semi-conducting shield 8 of cable C. Lamp 26 limits the current delivered by transformer 30. The high voltage impressed on the semi-conducting shield 8 through pulley 12 may be varied by the continuous adjustable auto transformer 28 so that the current through the semi-conducting shield 8 can be reduced to a value that will not burn the shield. I have found that a voltage of 4 kilovolts can be used on one type of semi-conducting shielded cable with a 30 foot separation between pulleys 10 and 14. With high voltage on pulley 12 the voltage to ground in the semi-conducting shield 8 will vary from a maximum at pulley 12 to zero at pulleys 10 and 14. A meter relay 32 of any standard type includes a relay coil 34 having one side connected through a resistance 36 to an electrode 38 contacting slip ring 22 and the other side grounded. Meter relay 32 also includes an indicator pointer 40 and a scale 42. A neon lamp 44 is connected in parallel with resistance 36 and coil 34. A signal device, such as a horn, 46 is connected to L1 and L2 through switch 24 and normally open contacts 34C of meter relay 32.

In operation, with switch 24 closed and cable C passing from reel 2 to reel 16, no current will be induced in the pay-off end of broken conductor 20 until the conductor break passes pulley 10. After the break reaches pulley 14, maximum voltage will be induced in the pay-off reel end of conductor 20 because of the capacitance coupling between the semi-conducting shield 8 and the broken conductor 20. Because of the voltage induced in conductor 20, current will flow through conductor 20 to slip ring 22, electrode 38 which contacts and slides on slip ring 22. The current will flow through resistor 36 and meter relay coil 34 to ground completing the circuit to transformer 30. The set point of meter relay 32 is set sufficiently low so that the current through the meter relay will close the contacts 34C and activate the signal device 46. The value of resistor 36 is high enough so that the voltage drop across it and coil 34 is high enough to light the neon lamp 44 and prevent overload current from damaging the meter 40 of the meter relay. After the signal device 46 is activated and the conductor break has passed pulley 14, the reading of indicator 40 on scale 42 is noted.

Cable C is then re-reeled backward towards reel 2 until the reading of indicator 40 on scale 42 is one-half the previously noted value. The conductor break will then be located at pulley 12. If it was determined previously that the conductor break was near the reel 16 cable end or starting end, the set point of the meter relay should be set near zero because of the cable capacity in parallel with the resistor 36 and coil 34 results in a lower maximum meter relay reading.

In a trail of my invention, an 18,527 foot length of semi-conducting shielded cable with a broken conductor, it was found that the signal tracing method could not be used at all to locate the discontinuity because of the shielding. A capacitance test indicated that the discontinuity was located 14,900 feet from the outside end of the cable, and using the preferred embodiment of my invention, the discontinuity was indicated to be 2 feet from the actual location at 15,362 feet. Thus the capacity measurement was in error by 462 feet and my method by 2 feet.

While the preferred embodiment of my invention has been shown with three pulleys, 10, 12 and 14, it could also operate with two pulleys, such as 10 and 12 or 12 and 14. In this case, when a capacitance coupled current is first detected, the presence of the discontinuity is indicated, although not as accurate. With changes in the meter relay 32, the discontinuity could also be detected when the capacitance coupled current ceases to flow. My invention is intended to broadly include the detection of a change in capacitance coupled current caused by a conductor discontinuity where a current flowing through a part of a semi-conducting shield induces the capacitance coupled current.

I claim:

1. Apparatus for locating a conductor discontinuity in an electric cable with a semi-conducting sheath comprising a pay-off reel supporting a length of cable to be tested, a take-up reel spaced away from said pay-off reel, three aligned and equally spaced apart electrical contacts with the outer contacts connected to ground, a source of alternating current power connected to said contacts so that an alternating current flows in said sheath between the center contact and the outer contacts as the cable passes from the pay-off reel to the take-off reel and over said contacts, means on said takeup reel for grounding the leading end of said conductor, an ammeter, and circuit means connecting said ammeter between ground and the trailing end of the conductor under test on said pay-off reel whereby when said cable is passed from said pay-off reel to said takeup reel and a conductor discontinuity passes said contact next to said pay-off reel, a capacitance coupled current will flow in said conductor between the discontinuity and the trailing end and reach a maximum value when said discontinuity reaches said contact next to said takeup reel thereby locating said discontinuity at the center contact when said ammeter indicates half the maximum capacitance coupled current is flowing.

2. Apparatus according to claim 1 in which said contacts are pulleys over which said cable passes and which includes alarm means connected to said circuit means and responsive to the flow of said capacitance coupled current and means connected to said alarm means for adjusting the response level of said alarm means.

* * * * *